(12) United States Patent
Chen et al.

(10) Patent No.: US 11,403,939 B2
(45) Date of Patent: Aug. 2, 2022

(54) TRAFFIC CONDITION PREDICTION SYSTEM AND TRAFFIC CONDITION PREDICTION METHOD

(71) Applicant: Institute For Information Industry, Taipei (TW)

(72) Inventors: Yen-Lin Chen, Taipei (TW); Hsiu-Chih Chen, Taipei (TW); Chao-Wei Yu, Taipei (TW); Chieh-Min Chang, Taipei (TW); Meng-Tsan Li, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 195 days.

(21) Appl. No.: 17/019,249

(22) Filed: Sep. 12, 2020

(65) Prior Publication Data
US 2022/0036727 A1  Feb. 3, 2022

(30) Foreign Application Priority Data
Jul. 29, 2020 (TW) .................................. 109125612

(51) Int. Cl.
*G08G 1/01* (2006.01)
*G06K 9/62* (2022.01)
(Continued)

(52) U.S. Cl.
CPC ......... *G08G 1/0133* (2013.01); *G06K 9/6215* (2013.01); *G06T 7/73* (2017.01); *G06V 10/40* (2022.01); *G06V 20/52* (2022.01); *G06V 20/54* (2022.01); *G08G 1/0145* (2013.01); *G06T 2207/30232* (2013.01); *G06T 2207/30236* (2013.01); *G06T 2207/30241* (2013.01)

(58) Field of Classification Search
None
See application file for complete search history.

(56) References Cited

U.S. PATENT DOCUMENTS

| 4,521,803 | A | * | 6/1985 | Gittinger | ................. | H04N 11/24 348/433.1 |
| 5,434,927 | A | * | 7/1995 | Brady | .................... | G08G 1/015 348/148 |

(Continued)

FOREIGN PATENT DOCUMENTS

CN      111353418 A * 6/2020

*Primary Examiner* — Fekadeselassie Girma
(74) *Attorney, Agent, or Firm* — Maschoff Brennan

(57) ABSTRACT

A traffic condition prediction system and a traffic condition prediction method are disclosed. The method includes: determining a center of circle in a surveillance image of a target traffic scene; determining a first circle based on the center of circle and a first radius; extracting a plurality of first feature points along the circumference of the first circle according to a first preset sampling frequency; generating a scene feature of the target traffic scene at least based on the first feature points; determining whether the scene feature and a scene feature of another traffic scene are similar; and when determining that they are similar, predicting traffic condition of the target traffic scene through a prediction model used for predicting traffic condition of the other traffic scene. The scene feature of the target traffic scene and that of the other traffic scene are generated in a same way.

14 Claims, 13 Drawing Sheets

(51) Int. Cl.
*G06T 7/73* (2017.01)
*G06V 10/40* (2022.01)
*G06V 20/52* (2022.01)
*G06V 20/54* (2022.01)

(56) References Cited

U.S. PATENT DOCUMENTS

| | | | |
|---|---|---|---|
| 6,697,110 B1* | 2/2004 | Jaspers | H04N 9/04515 348/E9.01 |
| 11,113,964 B1* | 9/2021 | Siddiq | G08G 1/097 |
| 2006/0274917 A1* | 12/2006 | Ng | G06V 10/255 382/103 |
| 2014/0333906 A1* | 11/2014 | Hirono | H04N 9/3173 353/31 |
| 2017/0025000 A1* | 1/2017 | Lagassey | G08G 1/0116 |
| 2020/0053286 A1* | 2/2020 | Corona | H04N 5/23267 |
| 2020/0065978 A1* | 2/2020 | Jales Costa | G06V 20/56 |
| 2020/0103920 A1* | 4/2020 | Castorena Martinez | G08G 1/166 |
| 2020/0118423 A1* | 4/2020 | Moura | G08G 1/04 |
| 2022/0036727 A1* | 2/2022 | Chen | G06T 7/73 |

\* cited by examiner

```
for (index = 0 ; index < n ; index++)
{
  temp = S_2[0];
  for (counter = 1; counter < n)
    S_2[counter-1] = S_2[counter];
  S_2[n] = temp;
  S_2_rotated_set[index] = S_2;
}
```
— 40

```
for ( n_index = 0 ; n_index < n ; n_index++)
{
  if (S_1=S_2_rotated_set[n_index])
    return similar;
}
return not similar;
```
— 41

FIG. 4

TRAFFIC CONDITION PREDICTION SYSTEM AND TRAFFIC CONDITION PREDICTION METHOD

PRIORITY

This application claims priority to Taiwan Patent Application No. 109125612 filed on Jul. 29, 2020, which is hereby incorporated by reference in its entirety.

FIELD

Embodiments of the present invention relate to a prediction system and a prediction method. More specifically, embodiments of the present invention relate to a traffic condition prediction system and a traffic condition prediction method.

BACKGROUND

The existing traffic condition prediction technology may establish a prediction model of traffic condition for each traffic scene (e.g., a cross road) according to current or historical traffic condition data (e.g., traffic flow, vehicle density, average speed of vehicles) thereof, so as to use the prediction model to predict the traffic condition of the traffic scene at future time points and accordingly manage the traffic scene in real time (e.g., adjust the display time of traffic signs of the traffic scene or near the traffic scenes and allocate lanes), thereby achieving the effect of traffic evacuation and traffic flow manipulation.

However, it requires re-collecting training data each time and takes a lot of computing time for training models to set up an appropriate traffic condition prediction model for each traffic scene, which obviously is inefficient. Accordingly, the technical problem that has to be conquered in the art is how to reduce the time for establishing a traffic prediction model and thereby improve the efficiency of predicting traffic condition in the traffic scene.

SUMMARY

To solve at least the aforesaid problems, certain embodiments of the present invention provide a traffic condition prediction system. The traffic condition prediction system may comprise a storage and a processor that are electrically connected to each other. The storage may be configured to store a first scene feature of a first traffic scene, a first prediction model for predicting traffic condition of the first traffic scene, and a surveillance image of a second traffic scene. The processor may be configured to: determine a center of circle in the surveillance image; determine a first circle based on the center of circle and a first radius; extract a plurality of first feature points on the surveillance image along the circumference of the first circle according to a first preset sampling frequency; generate a second scene feature of the second traffic scene at least according to the plurality of first feature points; determine whether the first scene feature is similar to the second scene feature; and when determining that the first scene feature is similar to the second scene feature, predict traffic condition of the second traffic scene through the first prediction model. The first scene feature and the second scene feature are generated in a same way.

To solve at least the aforesaid problems, certain embodiments of the present invention provide a traffic condition prediction system. The traffic condition prediction system may comprise a storage and a process that are electrically connected to each other. The storage may be configured to store a first scene feature of a first traffic scene, a first prediction model for predicting traffic condition of the first traffic scene, at least one actual vehicle trajectory related to a second traffic scene, and a surveillance image of the second traffic scene. The processor may be configured to: determine a center of circle in the surveillance image; determine a first circle based on the center of circle and a first radius; extract a plurality of first feature points on the surveillance image along the circumference of the first circle according to a first preset sampling frequency; generate a second scene feature of the second traffic scene at least according to the plurality of first feature points; determine whether the first scene feature is similar to the second scene feature; and when determining that the first scene feature is similar to the second scene feature, predict at least one vehicle trajectory related to the second traffic scene through the first prediction model, and determine whether the at least one actual vehicle trajectory is similar to the at least one predicted vehicle trajectory; and when determining that the at least one actual vehicle trajectory is similar to the at least one predicted vehicle trajectory, predict the traffic condition of the second traffic scene through the first prediction model. The first scene feature and the second scene feature are generated in a same way.

To solve at least the aforesaid problems, certain embodiments of the present invention provide a traffic condition prediction method for a traffic condition prediction system. The traffic condition prediction system may store a first scene feature of a first traffic scene, a first prediction model for predicting traffic condition of the first traffic scene, and a surveillance image of a second traffic scene. The traffic condition prediction method may comprise the following steps: determining a center of circle in the surveillance image; determining a first circle based on the center of circle and a first radius; extracting a plurality of first feature points on the surveillance image along the circumference of the first circle according to a first preset sampling frequency; generating a second scene feature of the second traffic scene at least according to the plurality of first feature points; determining whether the first scene feature is similar to the second scene feature; and when determining that the first scene feature is similar to the second scene feature, predicting traffic condition of the second traffic scene through the first prediction model. The first scene feature and the second scene feature are generated in a same way.

To solve at least the aforesaid problems, certain embodiments of the present invention provide a traffic condition prediction method for a traffic condition prediction system. The traffic condition prediction system may store a first scene feature of a first traffic scene, a first prediction model for predicting traffic condition of the first traffic scene, at least one actual vehicle trajectory related to a second traffic scene and a surveillance image of the second traffic scene. The traffic condition prediction method may comprise the following steps: determining a center of circle in the surveillance image; determining a first circle based on the center of circle and a first radius; extracting a plurality of first feature points on the surveillance image along the circumference of the first circle according to a first preset sampling frequency; generating a second scene feature of the second traffic scene at least according to the plurality of first feature points; determining whether the first scene feature is similar to the second scene feature; when determining that the first scene feature is similar to the second scene feature, predicting at least one predicted vehicle trajectory related to the second traffic scene through the first prediction model, and determining whether the at least one actual vehicle trajectory is similar to the at least one predicted vehicle trajectory; and when determining that the at least one actual vehicle trajectory is similar to the at least one predicted vehicle trajectory, predicting the traffic condition of the second traffic scene through the first prediction model. The first scene feature and the second scene feature are generated in a same way.

According to some embodiments, when it is determined that the first scene feature is similar to the second scene feature, the traffic condition of the second traffic scene can be predicted directly according to the first prediction model which is used for predicting the traffic condition of the first traffic scene. In this way, it is unnecessary to re-establish the prediction model for the second traffic scene, so the time for establishing the prediction model can be shortened and thus the efficiency of predicting the second traffic scene is improved.

In addition, according to some other embodiments, when it is determined that the first scene feature is similar to the second scene feature, the similarity between the at least one actual vehicle trajectory and the at least one predicted vehicle trajectory may be further considered, and when it is determined that the at least one actual vehicle trajectory is similar to the at least one predicted vehicle trajectory, the traffic condition of the second traffic scene is predicted directly according to the first prediction model which is used for predicting the traffic condition of the first traffic scene. Similarly, in this way, it is also unnecessary to re-establish the prediction model for the second traffic scene, so the time for establishing the prediction model can be shortened and thus the efficiency of predicting the second traffic scene is improved. Because the similarity between vehicle trajectories is additionally considered, the reliability of using the first prediction model to predict the traffic condition of the second traffic scene can be increased.

To solve at least the aforesaid problems, certain embodiments of the present invention provide a traffic condition prediction system. The traffic condition prediction system may comprise a storage and a processor that are electrically connected to each other. The storage may be configured to store a first prediction model for predicting traffic condition of a first traffic scene, and at least one actual vehicle trajectory related to a second traffic scene. The processor may be configured to: predict at least one vehicle trajectory related to the second traffic scene through the first prediction model; determine whether the at least one actual vehicle trajectory is similar to the at least one predicted vehicle trajectory; and when determining that the at least one actual vehicle trajectory is similar to the at least one predicted vehicle trajectory, predict the traffic condition of the second traffic scene through the first prediction model.

To solve at least the aforesaid problems, certain embodiments of the present invention provide a traffic condition prediction system. The traffic condition prediction system may comprise a storage and a process that are electrically connected to each other. The storage may be configured to store a first scene feature of a first traffic scene, a first prediction model for predicting traffic condition of the first traffic scene, at least one actual vehicle trajectory related to a second traffic scene, and a surveillance image of the second traffic scene. The processor may be configured to: predict at least one vehicle trajectory related to the second traffic scene through the first prediction model; determine whether the at least one actual vehicle trajectory is similar to the at least one predicted vehicle trajectory; and when determining that the at least one actual vehicle trajectory is similar to the at least one predicted vehicle trajectory, determine a center of circle in the surveillance image; determine a first circle based on the center of circle and a first radius; extract a plurality of first feature points on the surveillance image along the circumference of the first circle according to a first preset sampling frequency; generate a second scene feature of the second traffic scene at least according to the plurality of first feature points; determine whether the first scene feature is similar to the second scene feature; and when determining that the first scene feature is similar to the second scene feature, predict traffic condition of the second traffic scene through the first prediction model. The first scene feature and the second scene feature are generated in a same way.

To solve at least the aforesaid problems, certain embodiments of the present invention provide a traffic condition prediction method for a traffic condition prediction system. The traffic condition prediction system may store a first prediction model for predicting traffic condition of a first traffic scene, and at least one actual vehicle trajectory related to a second traffic scene. The traffic condition prediction method may comprise the following steps: predicting at least one predicted vehicle trajectory related to the second traffic scene through the first prediction model; determining whether the at least one actual vehicle trajectory is similar to the at least one predicted vehicle trajectory; and when determining that the at least one actual vehicle trajectory is similar to the at least one predicted vehicle trajectory, predicting the traffic condition of the second traffic scene through the first prediction model.

To solve at least the aforesaid problems, certain embodiments of the present invention provide a traffic condition prediction method for a traffic condition prediction system. The traffic condition prediction system may store a first scene feature of a first traffic scene, a first prediction model for predicting traffic condition of the first traffic scene, at least one actual vehicle trajectory related to a second traffic scene and a surveillance image of the second traffic scene. The traffic condition prediction method may comprise the following steps: predicting at least one predicted vehicle trajectory related to the second traffic scene through the first prediction model; determine whether the at least one actual vehicle trajectory is similar to the at least one predicted vehicle trajectory; when determining that the at least one actual vehicle trajectory is similar to the at least one predicted vehicle trajectory, determining a center of circle in the surveillance image; determining a first circle based on the center of circle and a first radius; extracting a plurality of first feature points on the surveillance image along the circumference of the first circle according to a first preset sampling frequency; generating a second scene feature of the second traffic scene at least according to the plurality of first feature points; determining whether the first scene feature is similar to the second scene feature; and when determining that the first scene feature is similar to the second scene feature, predicting the traffic condition of the second traffic scene through the first prediction model. The first scene feature and the second scene feature are generated in a same way.

According to some embodiments, when it is determined that the at least one actual vehicle trajectory is similar to the at least one predicted vehicle trajectory, the traffic condition of the second traffic scene can be predicted directly according to the first prediction model which is used for predicting the traffic condition of the first traffic scene. In this way, it is unnecessary to re-establish the prediction model for the second traffic scene, so the time for establishing the prediction model can be shortened and thus the efficiency of predicting the second traffic scene is improved.

In addition, according to some other embodiments, when it is determined that the at least one actual vehicle trajectory is similar to the at least one predicted vehicle trajectory, the similarity between the first scene feature and the second scene feature may be further considered, and when it is determined that the first scene feature is similar to the second scene feature, the traffic condition of the second traffic scene is predicted directly according to the first prediction model which is used for predicting the traffic condition of the first traffic scene. Similarly, in this way, it is also unnecessary to re-establish the prediction model for the second traffic scene, so the time for establishing the prediction model can be shortened and thus the efficiency of predicting the second traffic scene is improved. Because the similarity between scene features is additionally considered, the reliability of using the first prediction model to predict the traffic condition of the second traffic scene can be increased.

BRIEF DESCRIPTION OF THE DRAWINGS

The attached drawings can assist in explaining various embodiments of the present invention, in which:

FIG. 4 is a schematic view illustrating an algorithm for scene similarity comparison by the traffic condition prediction system according to some embodiments of the present invention;

DETAILED DESCRIPTION

Figure 1:
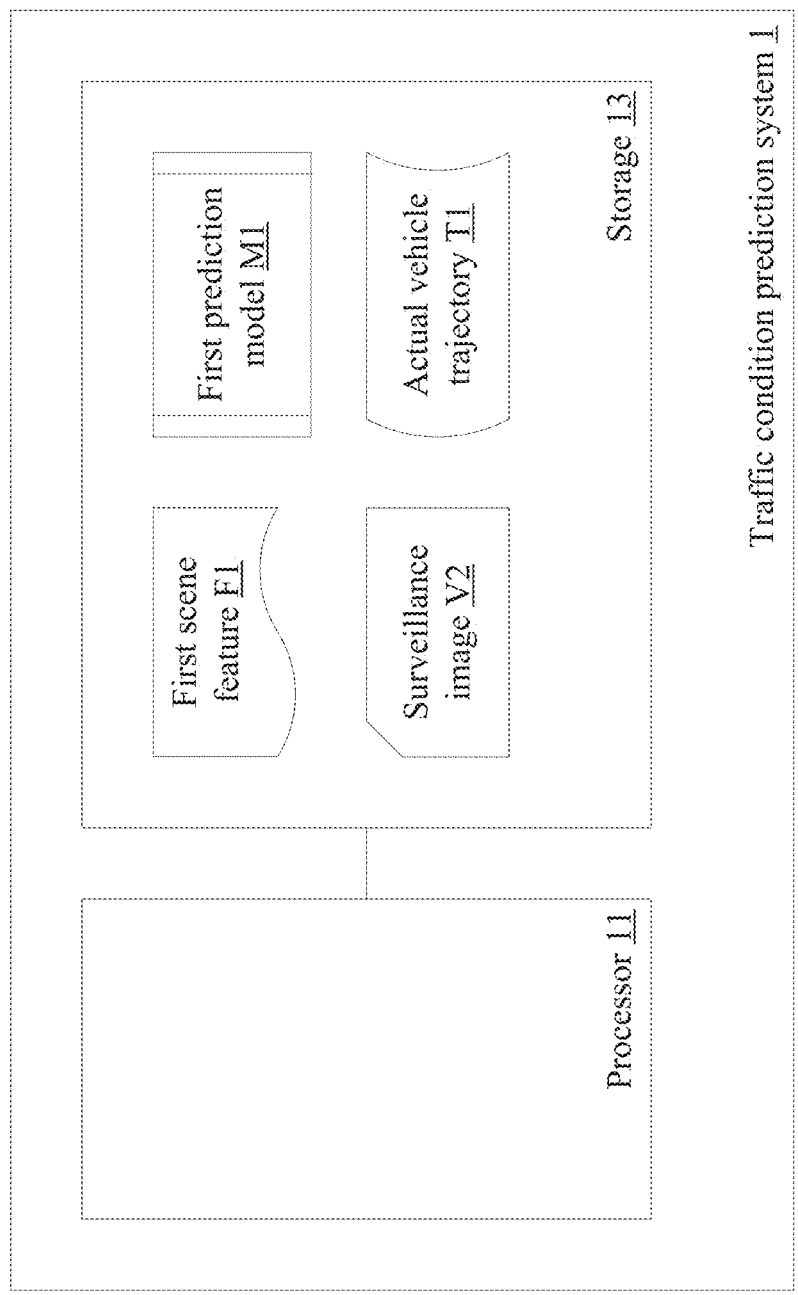
FIG. 1 is a block diagram illustrating a traffic condition prediction system according to some embodiments of the present invention.

The present invention will be described below with reference to certain example embodiments thereof; however, these example embodiments are not intended to limit the present invention to any operations, environment, applications, structures, processes or steps described in these example embodiments. For ease of description, contents that are not directly related to the embodiments of the present invention or that can be understood without special explanation will be omitted from the description and the attached drawings. In the attached drawings, dimensions of elements and proportional relationships among individual elements are only exemplary examples but not intended to limit the scope claimed in the present invention. Unless stated particularly, same (or similar) reference numerals may correspond to same (or similar) elements in the following description. In the case of being applicable, the number of each element described below may be one or more unless otherwise specified.

Terms used in the present disclosure are only used to describe the embodiments, and are not intended to limit the scope claimed in the present invention. Unless the context clearly indicates otherwise, singular forms "a" and "an" are also intended to include the plural form. Terms such as "comprising" and "including" indicate the presence of stated features, integers, steps, operations, elements and/or components, but do not exclude the presence of one or more other features, integers, steps, operations, elements, components and/or combinations thereof. The term "and/or" includes any and all combinations of one or more related listed items.

FIG. 1 is a block diagram illustrating a traffic condition prediction system according to some embodiments of the present invention; however, the contents thereof are only for illustrating the embodiments of the present invention, but not for limiting the scope claimed in the present invention. Referring to FIG. 1, a traffic condition prediction system 1 may comprise a processor 11 and a storage 13 electrically connected to each other.

The processor 11 may be any of various microprocessors or microcontrollers capable of signal processing. The microprocessor or the microcontroller is a kind of programmable specific integrated circuit that is capable of operating, storing, outputting/inputting or the like. Moreover, the microprocessor or the microcontroller can receive and process various coded instructions, thereby performing various logical operations and arithmetical operations and outputting corresponding operation results. The processor 11 may be programmed to interpret various instructions and execute various tasks or programs. For example, as described later, the processor 11 may be configured to generate a second scene feature of a second traffic scene, determine whether the first scene feature is similar to the second scene feature, and predict the traffic condition of the second traffic scene through the first prediction model when determining that the two scenes are similar. For another example, as described later, the processor 11 may also be configured to generate a second scene feature of the second traffic scene, determine whether the first scene feature is similar to the second scene feature, predict at least one vehicle trajectory related to the second traffic scene through the first prediction model when determining that the two scenes are similar, determine whether the actual vehicle trajectory is similar to the predicted vehicle trajectory, and predict the traffic conditions of the second traffic scene through the first prediction model when determining that the actual vehicle trajectory is similar to the predicted vehicle trajectory.

The storage 13 may comprise various storage units included in general computing devices/computers. The storage 13 may comprise a primary memory (which is also called a main memory or internal memory) which is usually called a memory for short and directly connected to the processor 11. The processor 111 may read instruction sets stored in the memory, and execute these instruction sets if needed. The storage 13 may further comprise a secondary memory (which is also called an external memory or auxiliary memory) which is connected to the processor 11 through an I/O channel of the memory and uses a data buffer to transmit data to the primary memory. The secondary memory may for example be one of various kinds of hard disks, optical disks or the like. The storage 13 may also comprise a third-level memory, e.g., a mobile disk that can be inserted into or pulled out from a computer directly, or a cloud hard disk. In some embodiments, the storage 13 may be configured to store a first scene feature F1 of a first traffic scene, a first prediction model M1 for predicting traffic condition of the first traffic scene, and a surveillance image V2 of a second traffic scene. In some embodiments, in addition to the first scene feature F1 of the first traffic scene, a first prediction model M1 for predicting the traffic condition of the first traffic scene, and a surveillance image V2 of a second traffic scene, the storage 13 may also store at least one actual vehicle trajectory T1 related to the second traffic scene.

In some embodiments, the traffic condition prediction system 1 may further comprise a camera electrically connected to the storage 13, and the surveillance image V2 of the aforesaid second traffic scene may be taken by the camera of the traffic condition prediction system 1 and be stored in the storage 13. In some other embodiments, the surveillance image V2 of the second traffic scene may also be taken by an external camera, and then transmitted to the traffic condition prediction system 1 through other electronic devices. In this case, the traffic condition prediction system 1 may further comprise a connection interface electrically connected to the storage 13 for receiving and storing the surveillance image V2 into the storage 13.

Figure 2:
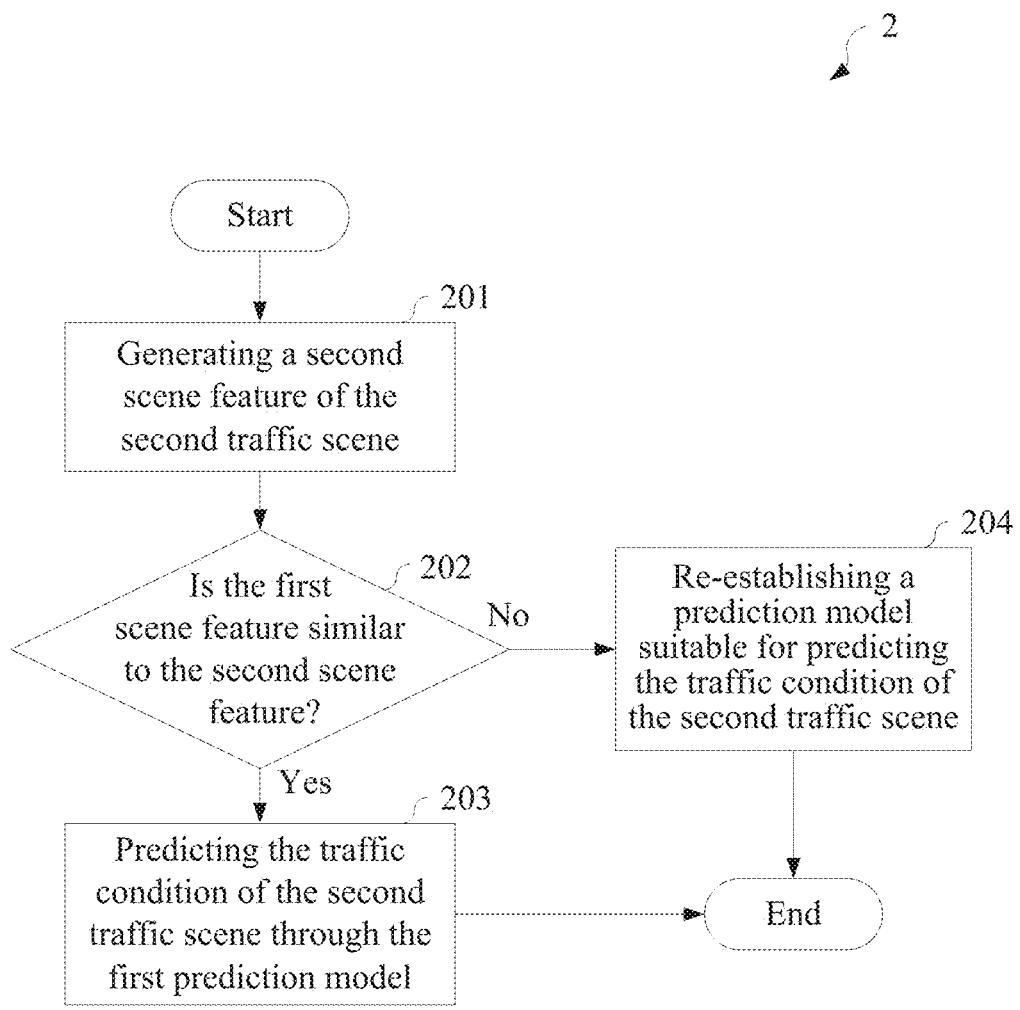
FIG. 2 is a schematic view illustrating a traffic condition prediction flow by the traffic condition prediction system according to some embodiments of the present invention.

FIG. 2 is a schematic view illustrating a traffic condition prediction flow 2 by the traffic condition prediction system 1 according to some embodiments of the present invention; however, the contents thereof are only for illustrating the embodiments of the present invention, but not for limiting the scope claimed in the present invention. Referring to FIG. 2, the processor 11 may first generate a second scene feature of a second traffic scene (labeled as action 201), and then determine whether the first scene feature F1 is similar to the second scene feature, wherein the first scene feature F1 and the second scene feature are generated in a same way and are represented by numerical sequences with the same length (labeled as action 202). The first scene feature F1 may be pre-generated by the processor 11 and stored in the storage 13, or may be pre-generated by other external generating devices and then input to the traffic condition prediction system 1. When the processor 11 determines that the two scenes are similar in the action 202, it may predict the traffic condition of the second traffic scene through the first prediction model M1 (labeled as action 203). On the contrary, when the processor 11 determines that the two scenes are not similar in the action 202, it will not predict the traffic condition of the second traffic scene through the first prediction model M1, but re-establish a prediction model suitable for predicting the traffic condition of the second traffic scene (labeled as action 204). In detail, in the action 203, the first prediction model M1 may be used for predicting the traffic conditions of the second traffic scene at future time points, thereby managing the second traffic scene in real time (e.g., adjusting the display time of traffic signs of the second traffic scene or near the traffic scene and allocate lanes), and achieving the effect of traffic evacuation and traffic flow manipulation.

In the action 201, the processor 11 may generate the second scene feature of the second traffic scene through a concept similar to Local binary patterns (LBP), and the operation details thereof will be explained with reference to FIG. 3A to FIG. 3D. FIG. 3A to FIG. 3D each illustrate a schematic view for generating a second scene feature of a second traffic scene by the traffic condition prediction system 1 in different embodiments of the present invention; however, the contents thereof are only for illustrating the embodiments of the present invention, but not for limiting the scope claimed in the present invention.

Figure 3A:
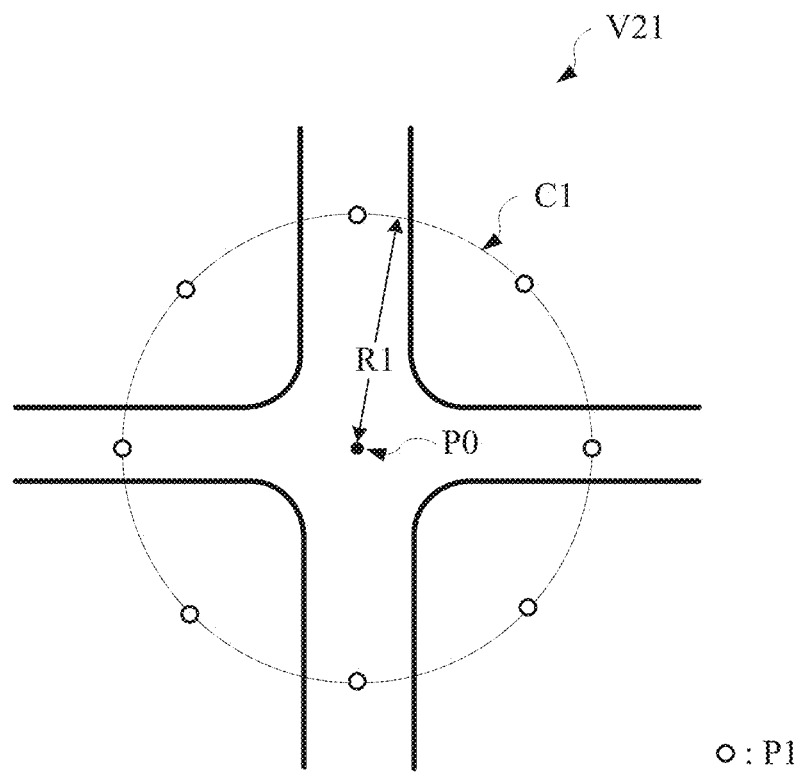
FIG. 3A to FIG. 3D illustrate schematic views for generating a second scene feature of a second traffic scene by the traffic condition prediction system according to some embodiments of the present invention.

First referring to FIG. 3A, the processor 11 may determine a center of circle P0 in a surveillance image V21 of the second scene, determine a first circle C1 based on the center of circle P0 and a first radius R1, and extract a plurality of first feature points P1 on the surveillance image V21 along the circumference of the first circle C1 according to a first preset sampling frequency. As shown in FIG. 3A, it is assumed that the first preset sampling frequency adopted by the processor 11 is ⅛, i.e., one first feature point P1 is extracted each time after rotating by 45 degrees on the circumference of the first circle C1, and the processor 11 may extract a total of eight first feature points P1 on the circumference of the first circle C1.

Then, the processor 11 may generate a second scene feature of the second traffic scene according to the eight first feature points P1. In detail, the processor 11 may determine the category of each of the first feature points P1 and set the corresponding value thereof. For example, if a certain first feature point P1 is determined as "Road", then the corresponding value of the first feature point P1 is set to be "1", and if a certain first feature point P1 is determined as "Non-road", then the corresponding value of the first feature point P1 is set to be "0". Then, the second scene feature can be obtained by connecting all the above values in series. For example, in FIG. 3A, a numerical sequence of "10101010" representing the second scene feature can be obtained by connecting in series the corresponding values obtained clockwise along the circumference of the first circle C1 starting from the first feature point P1 at the top (at 12 o'clock position).

Figure 3B:
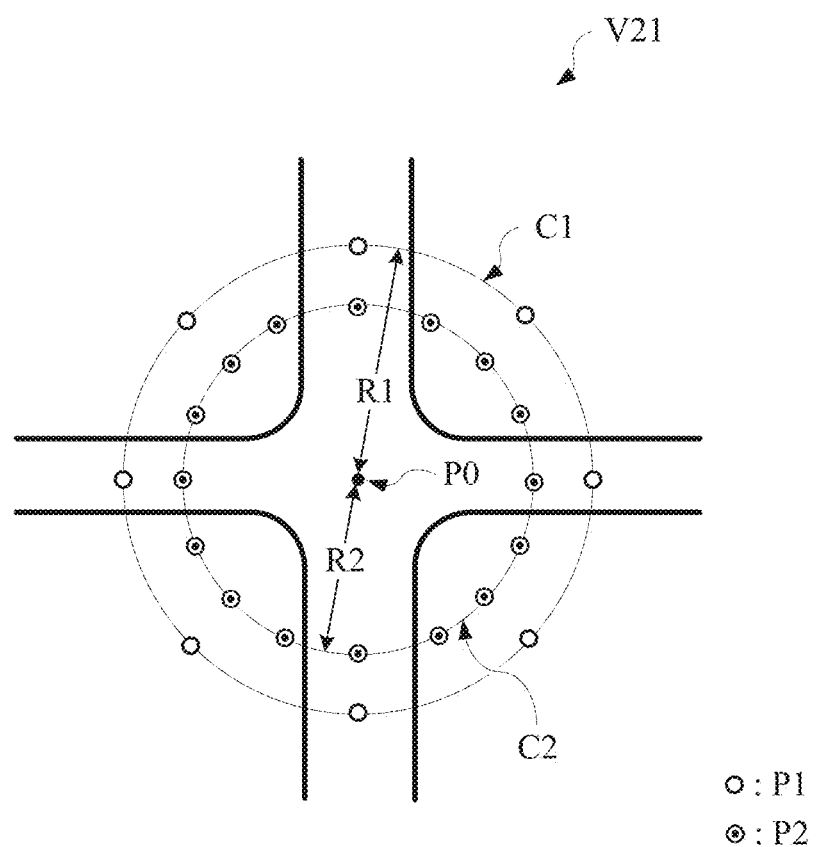

Next, referring to FIG. 3B, FIG. 3B illustrates another method for generating the second scene feature of the surveillance image V21 of the second traffic scene by the processor 11. As in FIG. 3A, the processor 11 may determine a center of circle P0 in the surveillance image V21 of the second scene, determine a first circle C1 based on the center of circle P0 and a first radius R1, and extract eight first feature points P1 on the surveillance image V21 along the circumference of the first circle C1 according to a first preset sampling frequency (for example, ⅛, i.e., one first feature point P1 is extracted each time after rotating by 45 degrees). The difference between FIG. 3B and FIG. 3A is that: in the embodiment shown in FIG. 3B, the processor 11 may further determine a second circle C2 based on the center of circle P0 and a second radius R2, and extract sixteen second feature points P2 on the surveillance image V21 along the circumference of the second circle C2 according to a second preset sampling frequency (for example, 1/16, i.e., one second feature point P2 is extracted each time after rotating by 22.5 degrees).

In this case, the processor 11 may generate the second scene feature according to the eight first feature points P1 and the sixteen second feature points P2. Similar to the aforementioned method, the processor 11 may determine the categories of the first feature points P1 and the second feature points P2 and set corresponding values thereof (the corresponding value of "Road" is "1" and the corresponding value of "Non-road" is "0"). Then, the processor 11 may connect in series all the values respectively corresponding to the first circle C1 and the second circle C2 to obtain the second scene feature. In the embodiment shown in FIG. 3B, a numerical sequence of "10101010 1000100010001000" representing the second scene feature can be obtained by connecting in series the corresponding values obtained clockwise along the circumference of the first circle C1 starting from the first feature point P1 at the top (at 12 o'clock position) of the first circle C1 and the corresponding values obtained clockwise along the circumference of the second circle C2 starting from the second feature point P2 at the top (at 12 o'clock position) of the second circle C2.

Figure 3C:
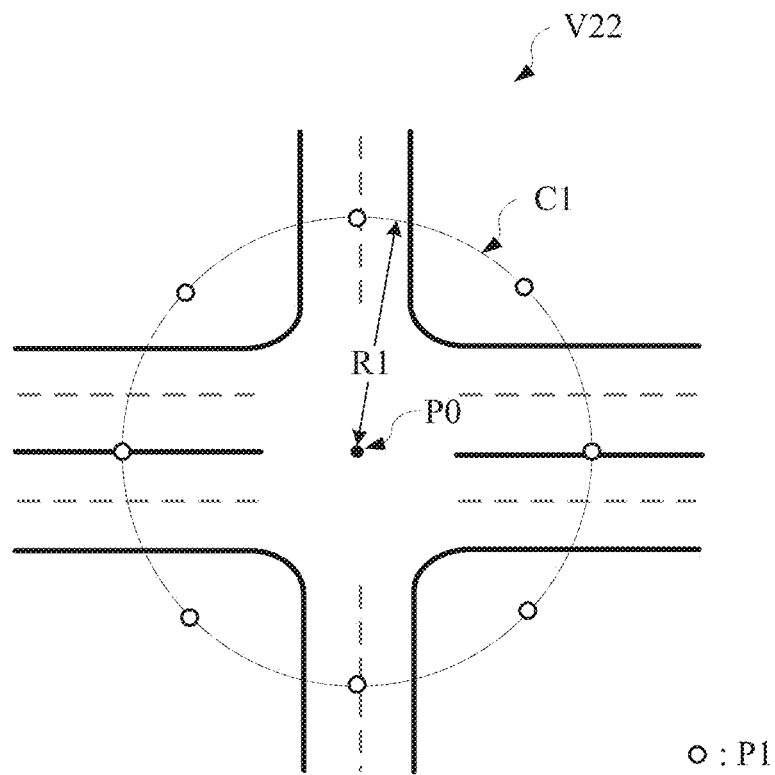
Figure 3D:
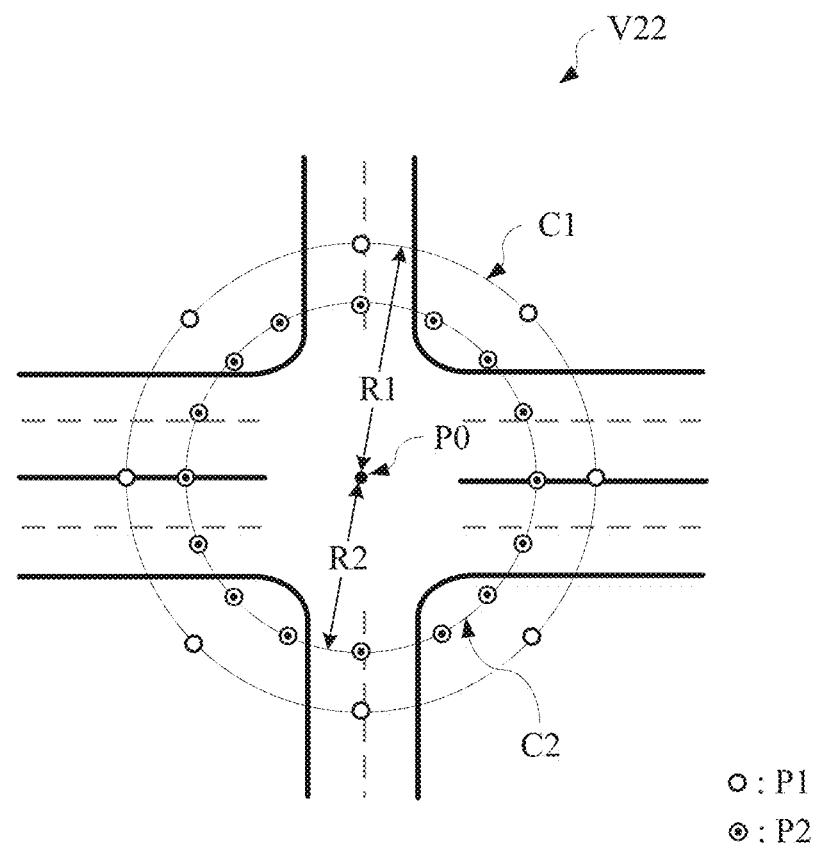

FIG. 3C and FIG. 3D respectively illustrate two methods for generating the second scene feature of a surveillance image V22 of another second traffic scene. The difference between FIG. 3C and FIG. 3A or between FIG. 3D and FIG. 3B is that: the processor 11 in FIG. 3C and FIG. 3D may further determine the road type of the feature point in addition to determining whether the feature point is a road. For example, the processor 11 may set the corresponding value of "Non-road" to be "0", set the corresponding value of "two-way one-line road" to be "1", set the corresponding value of "two-way two-line road" to be "2", and so on. In this case, in the embodiment shown in FIG. 3C, a numerical sequence of "10201020" representing the second scene feature can be obtained by connecting in series the corresponding values obtained clockwise along the circumference of the first circle C1 starting from the first feature point P1 at the top.

In addition, in FIG. 3D, similar to FIG. 3B, the processor 11 may further determine a second circle C2 based on the center of circle P0 and a second radius R2, and extract sixteen second feature points P2 along the circumference of the second circle C2 according to a second preset sampling frequency (for example, 1/16, i.e., a second feature point P2 is extracted each time after rotating by 22.5 degrees). In the embodiment shown in FIG. 3D, a numerical sequence of "10201020 1002220010022200" of the second scene feature can be obtained by connecting in series the corresponding values obtained clockwise along the circumference of the first circle C1 starting from the first feature point P1 at the top of the first circle C1 and the corresponding values obtained clockwise along the circumference of the second circle C2 starting from the second feature point P2 at the top of the second circle C2.

In some embodiments, according to different requirements, the sampling frequencies adopted by the first circle C1 and the second circle C2 described above may be the same (that is, the aforesaid first sampling frequency is equal to the second sampling frequency) or may be different (that is, the aforesaid first sampling frequency is not equal to the second sampling frequency). In addition, the first preset sampling frequency and the second preset sampling frequency may be determined according to different requirements. For example, the first preset sampling frequency and the second preset sampling frequency may be 1/4, 1/8, 1/12, 1/16, and 1/18.

In some embodiments, in addition to generating the second scene feature through the first circle C1 and the second circle C2, the processor 11 may also generate the second scene feature through more circles with different radii and according to the same or different sampling frequencies.

Next, please return to FIG. 2. In the action 202, the processor 11 may compare two numerical sequences representing the first scene feature F1 and the second scene feature based on a rotation invariance to determine whether the first scene feature F1 is similar to the second scene feature. Operation details of comparing whether the first scene feature F1 is similar to the second scene feature by the processor 11 will be explained by taking FIG. 4 as an example. FIG. 4 is a schematic view illustrating an algorithm for scene similarity comparison by the traffic condition prediction system according to some embodiments of the present invention; however, the contents thereof are only for illustrating the embodiments of the present invention, but not for limiting the scope claimed in the present invention.

Referring to FIG. 4, the processor 11 may first generate, through an algorithm code 40, a set of all possible numerical sequences after the second scene feature is rotated. In detail, "$S_2$" is the numerical sequence of the second scene feature, "n" is the length of the second scene feature, and "$S_{2\_rotated\_set}$" is the set of all possible numerical sequences after the second scene feature is rotated. Through the algorithm code 40, the processor 11 may record each numerical sequence of the second scene feature after rotation in "$S_{2\_rotated\_set}$". For example, if "$S_2$" is "1011", then the "$S_{2\_rotated\_set}$" generated by the processor 11 may be "{0111; 1110; 1101; 1011}".

Then, the processor 11 may compare the numerical sequences of the first scene feature with each possible numerical sequence after the second scene feature is rotated through an algorithm code 41. In detail, "$S_1$" is the first scene feature, and "n" is the number of all possible numerical sequences after the second scene feature is rotated. Through the algorithm code 41, when any numerical sequence in "$S_{2\_rotated\_set}$" matches the numerical sequence of the first scene feature, the processor 11 will return "similar", which means that it is determined that the first scene feature is similar to the second scene feature. Otherwise, the processor 11 may return "not similar", which means that it is determined that the first scene feature is not similar to the second scene feature.

Figure 5:
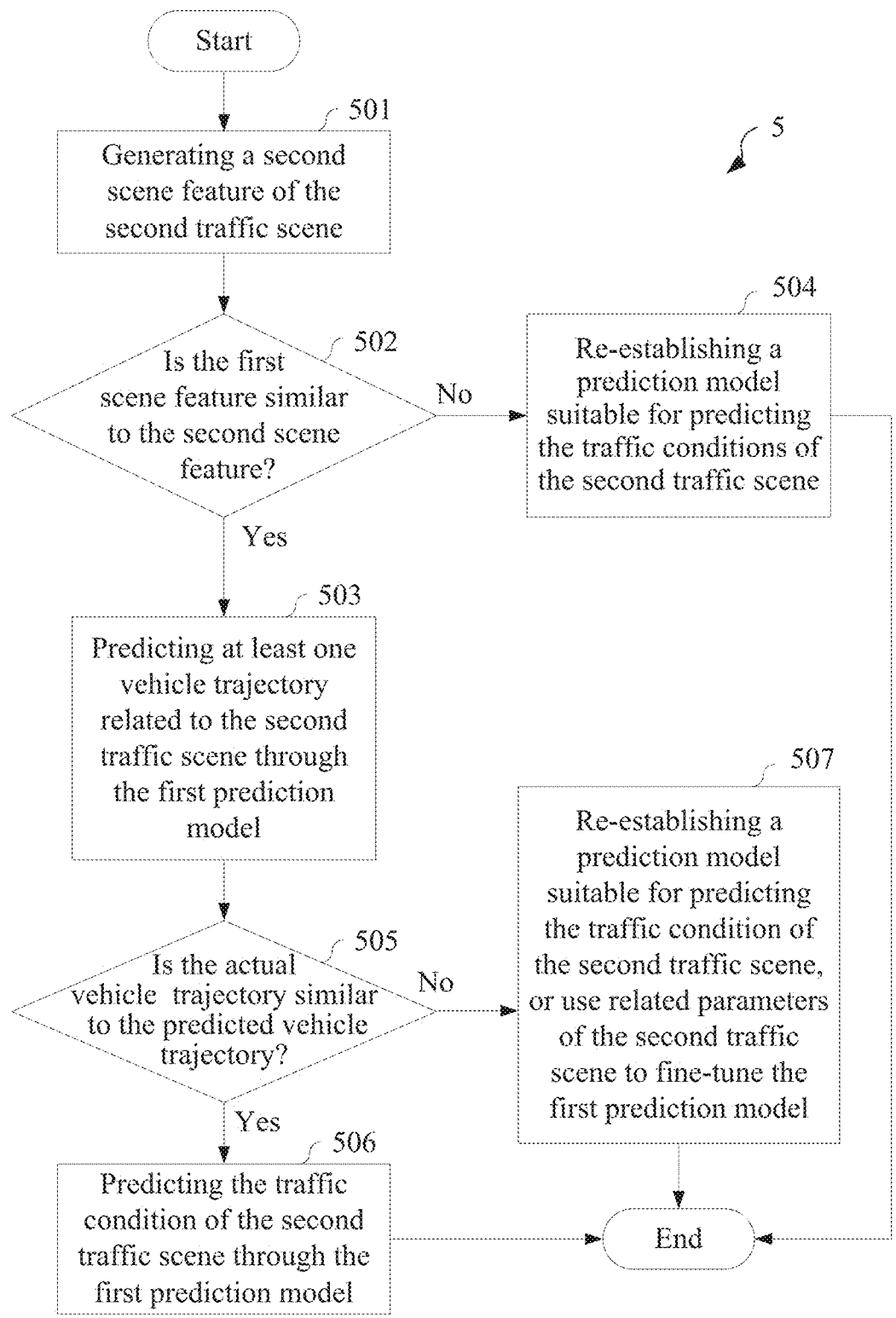
FIG. 5 is a schematic view illustrating a traffic condition prediction flow by the traffic condition prediction system according to some other embodiments of the present invention.

FIG. 5 is a schematic view illustrating a traffic condition prediction flow 5 by the traffic condition prediction system 1 according to some other embodiments of the present invention; however, the contents thereof are only for illustrating the embodiments of the present invention, but not for limiting the scope claimed in the present invention. Referring to FIG. 5, the processor 11 first generates a second scene feature of the second traffic scene (labeled as action 501), and then determines whether the first scene feature is similar to the second scene feature (labeled as action 502). When the processor 11 determines that the two scenes are not similar in the action 502, it will not predict the traffic condition of the second traffic scene through the first prediction model M1, but re-establish a prediction model suitable for predicting the traffic conditions of the second traffic scene (labeled as action 504). When the processor 11 determines that the two scenes are similar in the action 502, it will predict at least one vehicle trajectory related to the second traffic scene through the first prediction model M1 (labeled as action 503), and then determine whether the actual vehicle trajectory T1 is similar to the predicted vehicle trajectory (labeled as action 505). When the processor 11 determines that the actual vehicle trajectory T1 is similar to the predicted vehicle trajectory in the action 505, it will predict the traffic condition of the second traffic scene through the first prediction model M1 (labeled as action 506). On the contrary, when the processor 11 determines that the two vehicle trajectories are not similar in the action 505, it will not predict the traffic condition of the second traffic scene through the first prediction model M1 (labeled as action 507). In the action 507, the processor 11 may re-establish a prediction model suitable for predicting the traffic condition of the second traffic scene, or use related parameters of the second traffic scene to fine-tune the first prediction model M1, and then adopt the fine-tuned prediction model to predict the traffic condition of the second traffic scene.

Operation details of the above actions 501, 502, 504, and 506 may be the same as those of actions 201, 202, 204, and 203 in FIG. 2 respectively, and thus will not be further described herein.

As described above, in the action 503, the processor 11 may predict at least one vehicle trajectory related to the second traffic scene through the first prediction model M1. In some embodiments, each of the at least one actual vehicle trajectory T1 is represented by a binary code sequence, and each of the at least one predicted vehicle trajectory is also represented by a binary code sequence. In addition, each binary code sequence may be defined by a first symbol and a second symbol, wherein the first symbol represents the presence of lane switch, and the second symbol represents the absence of lane switch. The representation and generation of the actual vehicle trajectory T1 and the predicted vehicle trajectory by the processor 11 will be further explained with reference to FIG. 6 hereinafter.

Figure 6:
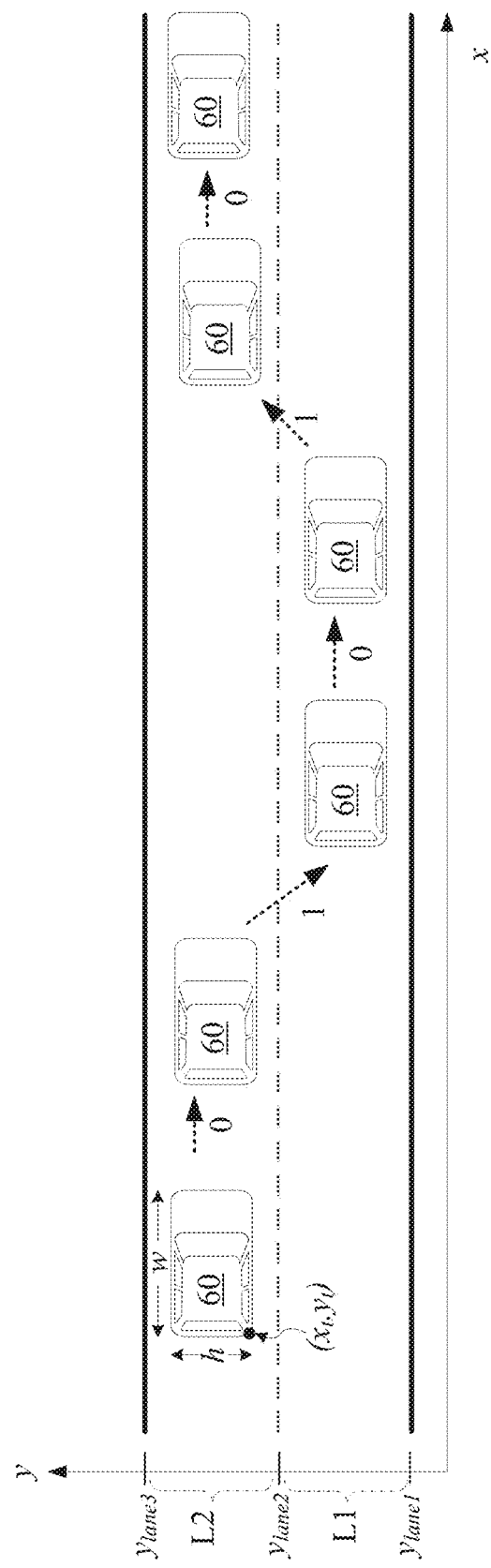
FIG. 6 is a schematic view illustrating a vehicle trajectory of a vehicle according to some embodiments of the present invention.

FIG. 6 is a schematic view illustrating a vehicle trajectory of a vehicle according to some embodiments of the present invention; however, the contents thereof are only for illustrating the embodiments of the present invention, but not for limiting the scope claimed in the present invention. As shown in FIG. 6, if a vehicle 60 switches lanes in a time interval, then the processor 11 will represent the vehicle trajectory corresponding to the time interval with a first symbol (e.g., "1"), and if the vehicle 60 does not switch lanes in the time interval, then the processor 11 will represent the vehicle trajectory corresponding to the time interval with a first symbol (e.g., "0").

In detail, the processor 11 may determine the vehicle trajectory of a vehicle in a time interval according to the following two equations:

$$\text{lane } index_t \begin{cases} 1, & \text{if } \left(y_t + \frac{h}{2}\right) > y_{lane1} \text{ and } \left(y_t + \frac{h}{2}\right) < y_{lane2} \\ 2, & \text{if } \left(y_t + \frac{h}{2}\right) > y_{lane2} \text{ and } \left(y_t + \frac{h}{2}\right) < y_{lane3} \end{cases} \quad \text{(Equation 1)}$$

$$\text{lane } switch_t \begin{cases} 0, & \text{if lane } index_t = \text{lane } index_{t-1} \\ 1, & \text{if lane } index_t \neq \text{lane } index_{t-1} \end{cases} \quad \text{(Equation 2)}$$

Meanwhile, referring to FIG. 6, "$(x_t, y_t)$" is the coordinate position of the lower left vertex of the vehicle at the time point "t" in the surveillance image of the lane, and "h" and "w" are the length values of the vehicle in the y-axis direction and the x-axis direction respectively. "$y_{lane1}$", "$y_{lane2}$" and "$y_{lane3}$" are respectively values of boundaries of each lane on the y axis (for example, the y value of the lower boundary of the first lane L1 is "$y_{lane1}$", while the y value of the upper boundary is "$y_{lane2}$").

In short, the processor 11 may first calculate "lane $index_t$", i.e., the lane information corresponding to the vehicle at a certain time point, through the Equation 1. For example, when the processor 11 determines that the vehicle is in the first lane L1, the "lane $index_t$" generated will be equal to "1"; and when the processor 11 determines that the vehicle is in the second lane L2, the "lane $index_t$" generated will be equal to "2", and so on.

Then, the processor 11 may calculate "lane $switch_t$", i.e., information regarding whether the vehicle switches lanes in a certain time interval (between a time point "t−1" and a time point "t"), through Equation 2. For example, if it is determined that the vehicle has switched lanes between the time point "t−1" and the time point "t", then "lane $switch_t$" will be equal to "1"; and if not, "lane $switch_t$" will be equal to "0".

Taking FIG. 6 as an example, according to Equations 1 and 2, the vehicle trajectory calculated by the processor 11 for the vehicle 60 may be expressed as "01010".

In some embodiments, the processor 11 may generate the actual vehicle trajectory T1 in advance by using the above method and store the generated actual vehicle trajectory T1 in the storage 13. In some other embodiments, the actual vehicle trajectory T1 may also be generated by an external computing device, and then input and stored in the traffic condition prediction system 1.

Next, please continue to refer to FIG. 5. As described above, in the action 505, the processor 11 may determine whether the at least one actual vehicle trajectory T1 is similar to the at least one predicted vehicle trajectory. In detail, the processor 11 may calculate an error between all actual vehicle trajectories T1 and all predicted vehicle trajectories. For example, the error may be defined as: the number of the target directions corresponding to the actual vehicle trajectories T1 that do not meet the target directions corresponding to the corresponding predicted vehicle trajectories (i.e., the number of incorrect predictions). The target direction corresponding to a vehicle trajectory of a vehicle may be defined as the moving direction of the vehicle after passing through a traffic scene, such as turning left, turning right and going straight. When the error between the actual vehicle trajectory T1 and the predicted vehicle trajectory is less than (or not greater than) a preset value, it may be determined that the actual vehicle trajectory T1 is similar to the predicted vehicle trajectory. On the contrary, when the error between the actual vehicle trajectory T1 and the predicted vehicle trajectory is greater than (or not less than) the preset value, it may be determined that the actual vehicle trajectory T1 is not similar to the predicted vehicle trajectory.

Figure 7:
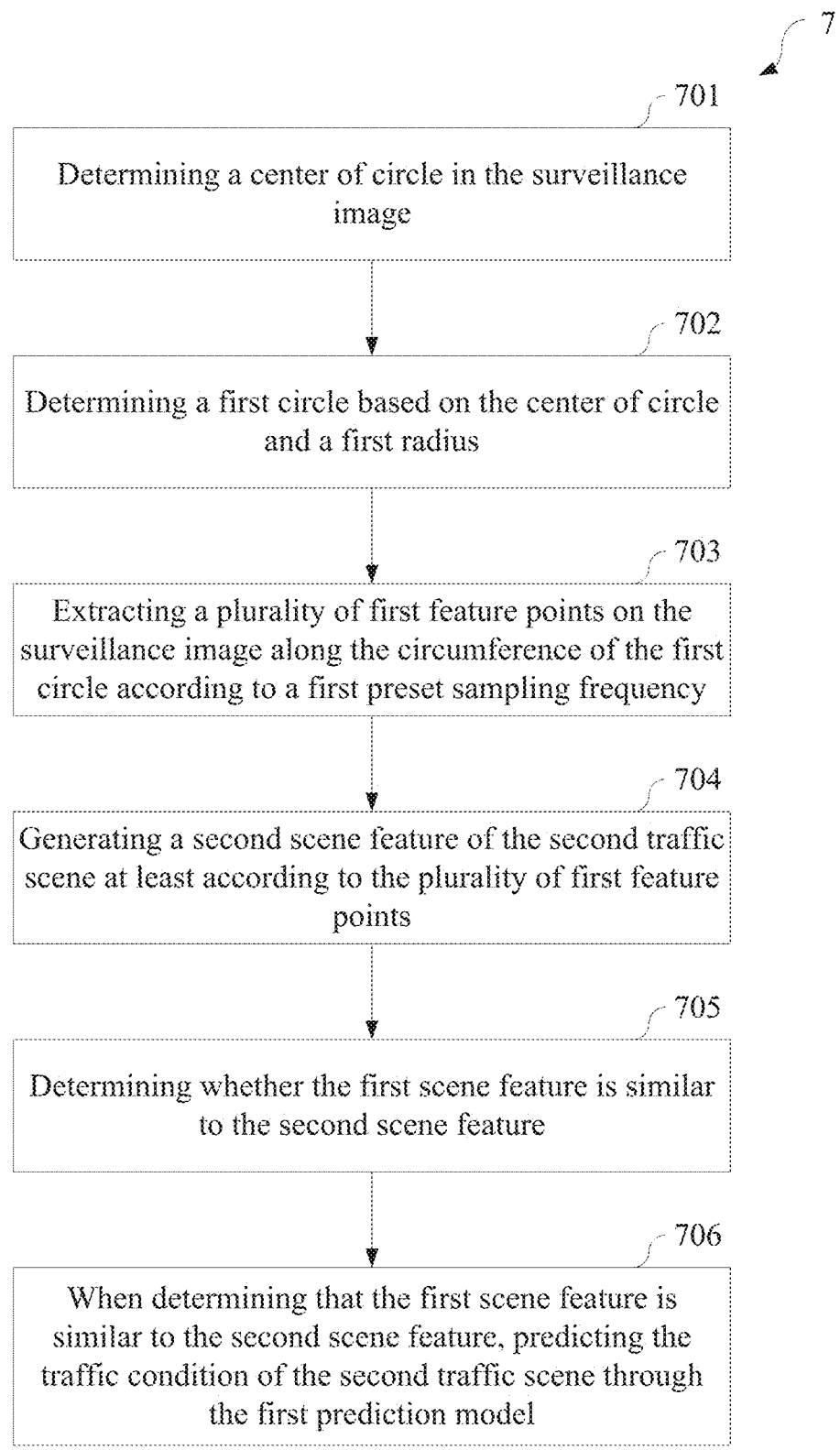
FIG. 7 is a schematic view illustrating a traffic condition prediction method according to some embodiments of the present invention.

FIG. 7 is a schematic view illustrating a traffic condition prediction method according to some embodiments of the present invention; however, the contents thereof are only for illustrating the embodiments of the present invention, but not for limiting the scope claimed in the present invention.

Referring to FIG. 7, a traffic condition prediction method 7 may be used in a traffic condition prediction system, and the traffic condition prediction system stores a first scene feature of a first traffic scene, a first prediction model for predicting the traffic condition of the first traffic scene, and a surveillance image of a second traffic scene. The traffic condition prediction method 7 may comprise the following steps: determining a center of circle in the surveillance image (labeled as step 701); determining a first circle based on the center of circle and a first radius (labeled as step 702); extracting a plurality of first feature points on the surveillance image along the circumference of the first circle according to a first preset sampling frequency (labeled as step 703); generating a second scene feature of the second traffic scene at least according to the plurality of first feature points (labeled as step 704); determining whether the first scene feature is similar to the second scene feature (labeled as step 705); and when determining that the first scene feature is similar to the second scene feature, predicting the traffic condition of the second traffic scene through the first prediction model (labeled as step 706). The first scene feature and the second scene feature are generated in a same way.

In some embodiments, in addition to the steps 701 to 706, the traffic condition prediction method 7 may further comprise the following steps: determining a second circle based on the center of circle and a second radius; and extracting a plurality of second feature points on the surveillance image along the circumference of the second circle according to a second preset sampling frequency. In addition, the traffic condition prediction system generates the second scene feature according to the plurality of first feature points and the plurality of second feature points.

In some embodiments, each of the first scene feature and the second scene feature is a numerical sequence, and the traffic condition prediction method further comprises the following steps: comparing the two numerical sequences based on a rotation invariance to determine whether the first scene feature and the second scene feature are similar.

In some embodiments, the surveillance image of the second traffic scene is taken by a camera.

Each embodiment of the traffic condition prediction method 7 essentially corresponds to a certain embodiment of the traffic condition prediction system 1. Therefore, even though each embodiment of the traffic condition prediction method 7 is not described in detail above, a person having ordinary skill in the art may directly understand the embodiments of the traffic condition prediction method 7 that are not described in detail according to the above description of the traffic condition prediction system 1.

Figure 8:
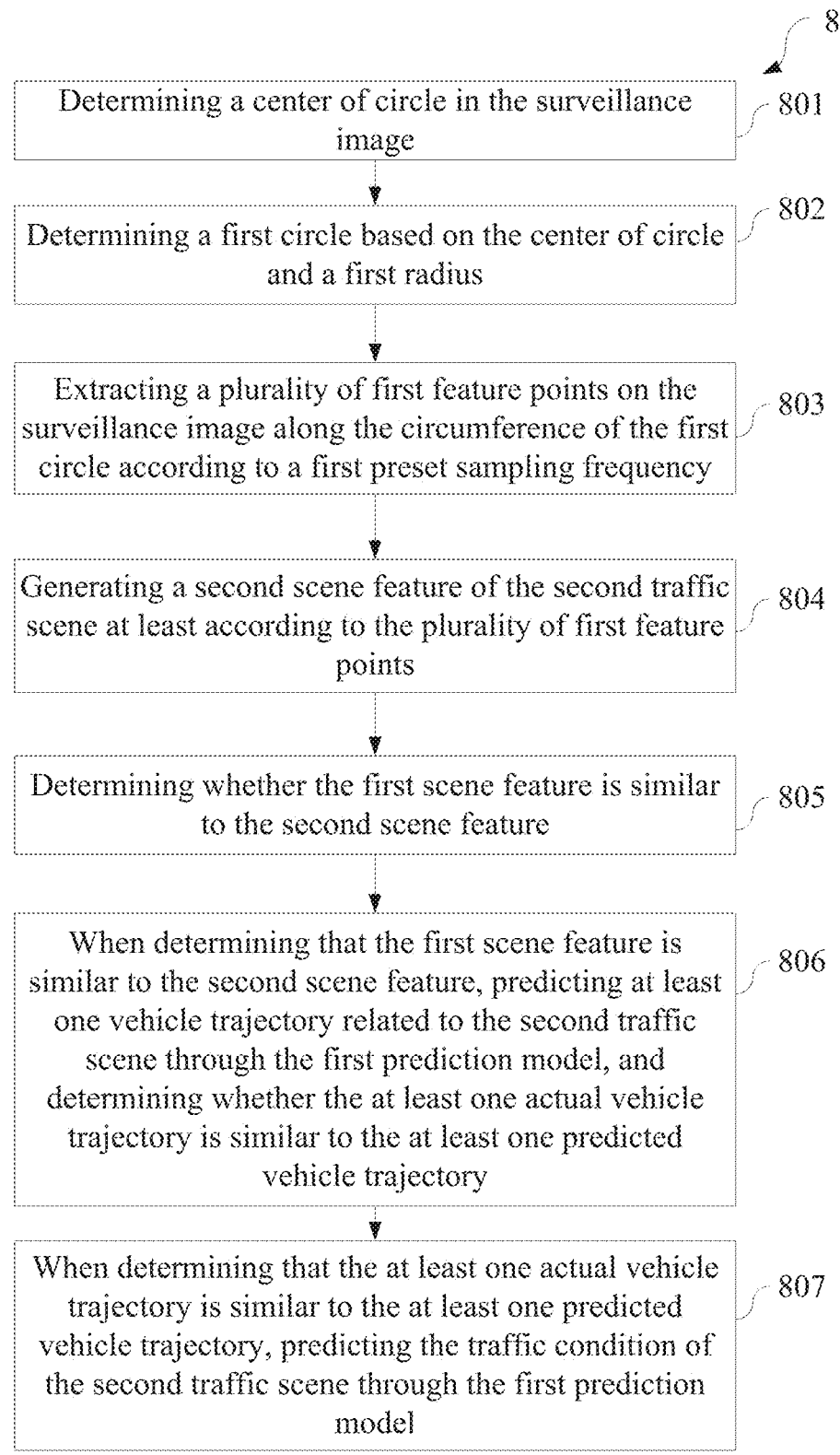
FIG. 8 is a schematic view illustrating a traffic condition prediction method according to some other embodiments of the present invention.

FIG. 8 is a schematic view illustrating a traffic condition prediction method according to some other embodiments of the present invention; however, the contents thereof are only for illustrating the embodiments of the present invention, but not for limiting the scope claimed in the present invention.

Referring to FIG. 8, a traffic condition prediction method 8 may be used in a traffic condition prediction system, and the traffic condition prediction system stores a first scene feature of a first traffic scene, a first prediction model for predicting the traffic condition of the first traffic scene, at least one actual vehicle trajectory related to the second traffic scene, and a surveillance image of a second traffic scene. The traffic condition prediction method 8 may comprise the following steps: determining a center of circle in the surveillance image (labeled as step 801); determining a first circle based on the center of circle and a first radius (labeled as step 802); extracting a plurality of first feature points on the surveillance image along the circumference of the first circle according to a first preset sampling frequency (labeled as step 803); generating a second scene feature of the second traffic scene at least according to the plurality of first feature points (labeled as step 804); determining whether the first scene feature is similar to the second scene feature (labeled as step 805); when determining that the first scene feature is similar to the second scene feature, predicting at least one predicted vehicle trajectory related to the second traffic scene through the first prediction model, and determining whether the at least one actual vehicle trajectory is similar to the at least one predicted vehicle trajectory (labeled as step 806); and when determining that the at least one actual vehicle trajectory is similar to the at least one predicted vehicle trajectory, predicting the traffic condition of the second traffic scene through the first prediction model (labeled as step 807). The first scene feature and the second scene feature are generated in a same way.

In some embodiments, in addition to the steps 801 to 807, the traffic condition prediction method 8 may further comprise the following steps: determining a second circle based on the center of circle and a second radius; and extracting a plurality of second feature points on the surveillance image along the circumference of the second circle according to a second preset sampling frequency. In addition, in the traffic condition prediction method 8, the traffic condition prediction system generates the second scene feature according to the plurality of first feature points and the plurality of second feature points.

In some embodiments, each of the first scene feature and the second scene feature is a numerical sequence, and the traffic condition prediction method further comprises the following steps: comparing the two numerical sequences based on a rotation invariance to determine whether the first scene feature and the second scene feature are similar.

In some embodiments, the surveillance image of the second traffic scene is taken by a camera.

In some embodiments, each of the at least one actual vehicle trajectory is represented by a binary code sequence, and each of the at least one predicted vehicle trajectory is also represented by a binary code sequence.

In some embodiments, each of the at least one actual vehicle trajectory is represented by a binary code sequence, and each of the at least one predicted vehicle trajectory is also represented by a binary code sequence, wherein each of all the binary code sequences representing the at least one actual vehicle trajectory and the at least one predicted vehicle trajectory is defined by a first symbol and a second symbol, the first symbol represents the presence of lane switch, and the second symbol represents the absence of lane switch.

Each embodiment of the traffic condition prediction method 8 essentially corresponds to a certain embodiment of the traffic condition prediction system 1. Therefore, even though each embodiment of the traffic condition prediction method 8 is not described in detail above, a person having ordinary skill in the art may directly understand the embodiments of the traffic condition prediction method 8 that are not described in detail according to the above description of the traffic condition prediction system 1.

Figure 9:
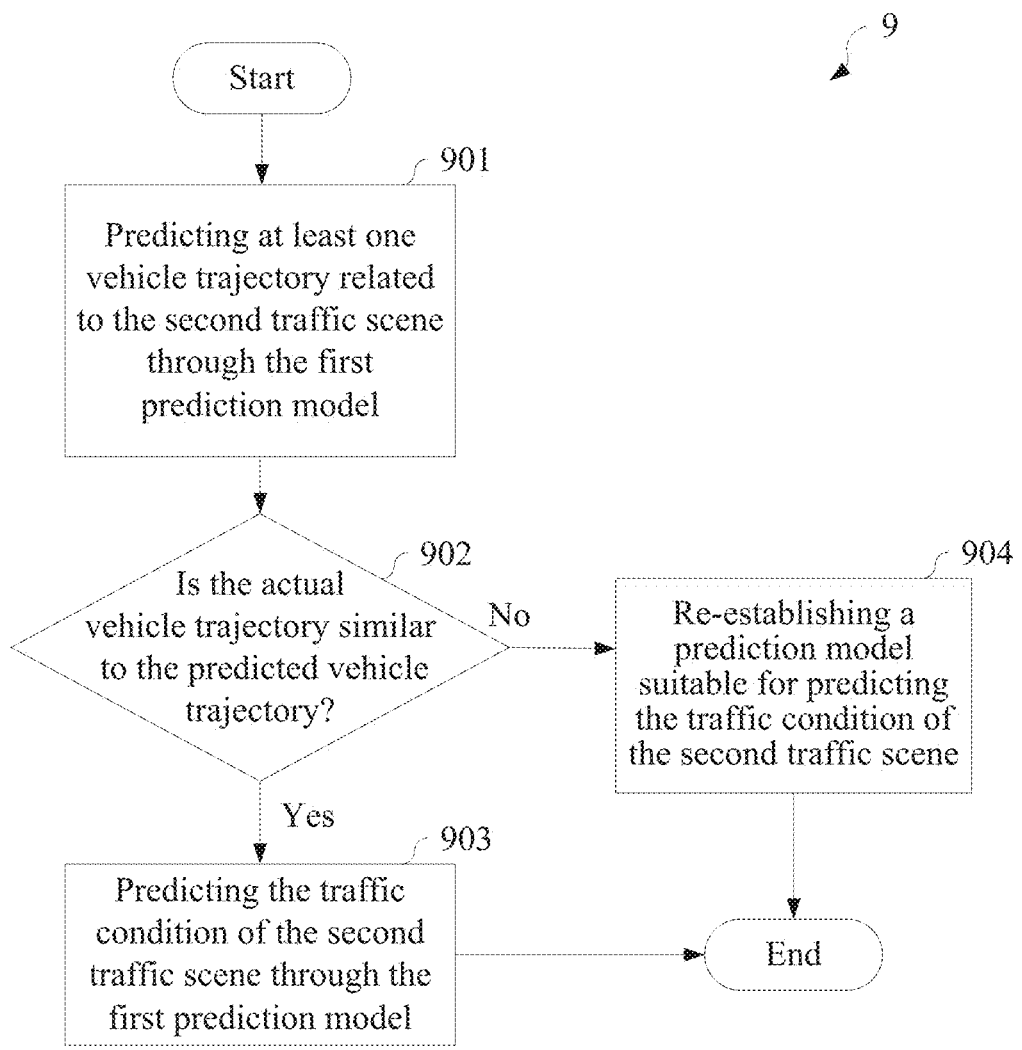
FIG. 9 is a schematic view illustrating a traffic condition prediction flow by the traffic condition prediction system according to some other embodiments of the present invention.

FIG. 9 is a schematic view illustrating a traffic condition prediction flow 9 by the traffic condition prediction system 1 according to some embodiments of the present invention; however, the contents thereof are only for illustrating the embodiments of the present invention, but not for limiting the scope claimed in the present invention. Referring to FIG. 9, the processor 11 may first predict at least one vehicle trajectory related to the second traffic scene through the first prediction model (labeled as action 901), and then determine whether the actual vehicle trajectory is similar to the predicted vehicle trajectory (labeled as action 902). When the processor 11 determines that the two vehicle trajectories are similar in the action 902, it will predict the traffic condition of the second traffic scene through the first prediction model (labeled as action 903). On the contrary, when the processor 11 determines that the two scenes are not similar in the action 902, it will not predict the traffic condition of the second traffic scene through the first prediction model, but re-establish a prediction model suitable for predicting the traffic condition of the second traffic scene (labeled as action 904).

Operation details of the above actions 901, 902, 903, and 904 may be the same as those of actions 503, 505, 506, and 504 in FIG. 5 respectively, and thus will not be further described herein.

In some embodiments, each of the at least one actual vehicle trajectory is represented by a binary code sequence, and each of the at least one predicted vehicle trajectory is also represented by a binary code sequence. Alternatively, each of all the binary code sequences representing the at least one actual vehicle trajectory and the at least one predicted vehicle trajectory is defined by a first symbol and a second symbol, the first symbol represents the presence of lane switch, and the second symbol represents the absence of lane switch.

Some embodiments of the present invention also encompass the traffic condition prediction method described below. The traffic condition prediction method may be used in a traffic condition prediction system, and the traffic condition prediction system stores a first prediction model for predicting the traffic condition of a first traffic scene and at least one actual vehicle trajectory related to the second traffic scene. The traffic condition prediction method comprises the following steps: predicting at least one predicted vehicle trajectory related to the second traffic scene through the first prediction model; determining whether the at least one actual vehicle trajectory is similar to the at least one predicted vehicle trajectory; and when determining that the at least one actual vehicle trajectory is similar to the at least one predicted vehicle trajectory, predicting the traffic condition of the second traffic scene through the first prediction model. Optionally, each of the at least one actual vehicle trajectory is represented by a binary code sequence, and each of the at least one predicted vehicle trajectory is also represented by a binary code sequence. Optionally, each of all the binary code sequences representing the at least one actual vehicle trajectory and the at least one predicted vehicle trajectory is defined by a first symbol and a second symbol, wherein the first symbol represents the presence of lane switch, and the second symbol represents the absence of lane switch.

Figure 10:
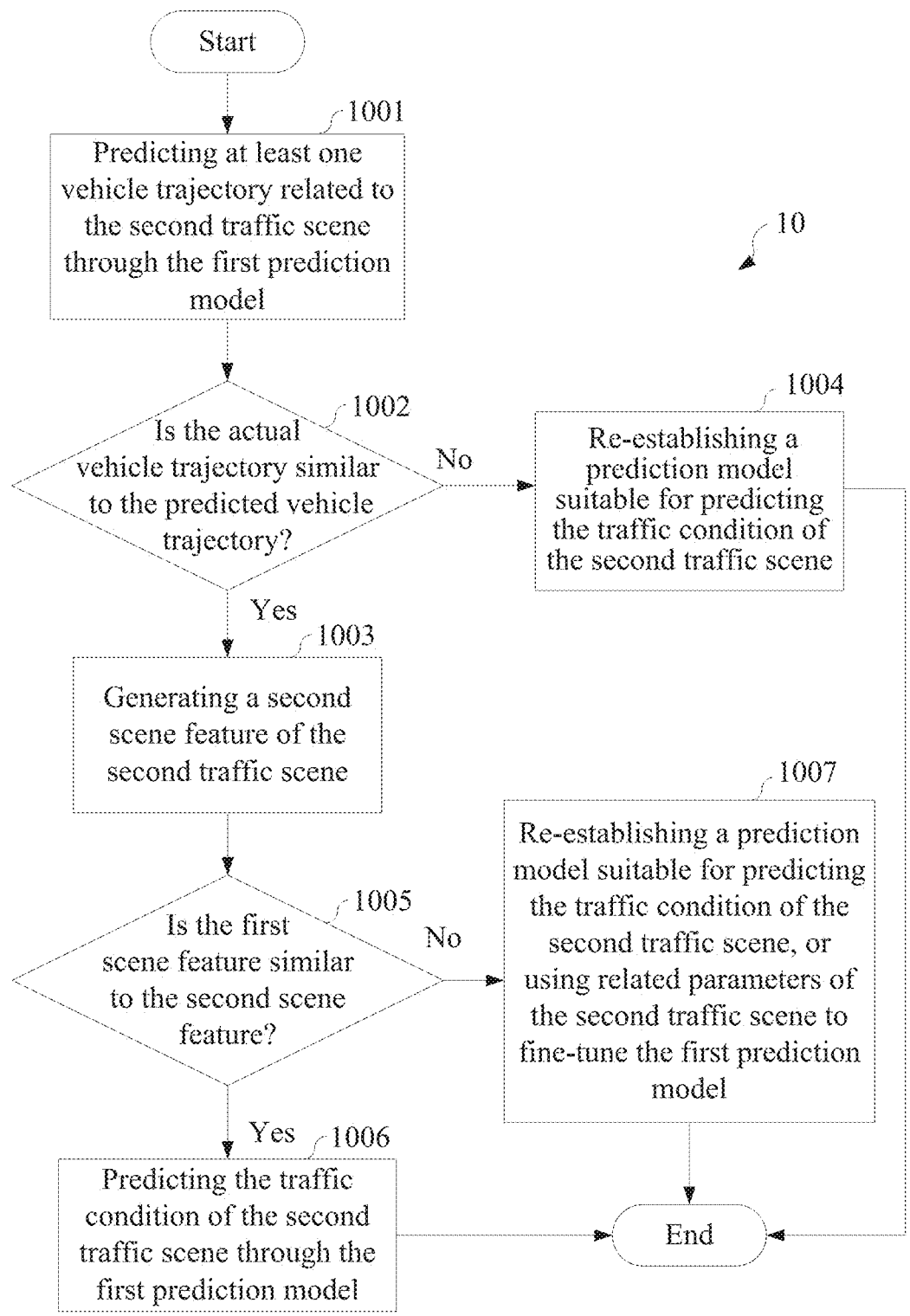
FIG. 10 is a schematic view illustrating a traffic condition prediction flow by the traffic condition prediction system according to some other embodiments of the present invention.

FIG. 10 is a schematic view illustrating a traffic condition prediction flow 10 by the traffic condition prediction system according to some other embodiments of the present invention; however, the contents thereof are only for illustrating the embodiments of the present invention, but not for limiting the scope claimed in the present invention. Referring to FIG. 10, the processor 11 may first predict at least one vehicle trajectory related to the second traffic scene through the first prediction model (labeled as action 1001), and then determine whether the actual vehicle trajectory is similar to the predicted vehicle trajectory (labeled as action 1002). When the processor 11 determines that the two vehicle trajectories are not similar in the action 1002, it will not predict the traffic condition of the second traffic scene through the first prediction model, but re-establish a prediction model suitable for predicting the traffic condition of the second traffic scene (labeled as action 1004). When the processor 11 determines that the two scenes are similar in the action 1002, it will generate a second scene feature of the second traffic scene (labeled as action 1003), and then determine whether the first scene feature is similar to the second scene feature (labeled as action 1005). When the processor 11 determines that the two scene features are similar in the action 1005, it will predict the traffic condition of the second traffic scene through the first prediction model (labeled as action 1006). On the contrary, when the processor 11 determines that the two scene features are not similar in the action 1005, it will not predict the traffic condition of the second traffic scene through the first prediction model (labeled as action 1007). In addition, in the action 1007, the processor 11 may re-establish a prediction model suitable for predicting the traffic condition of the second traffic scene, or use related parameters of the second traffic scene to fine-tune the first prediction model, and then adopt the fine-tuned prediction model to predict the traffic condition of the second traffic scene.

Operation details of the above actions 1001, 1002 and 1004 may be the same as those of actions 901, 902 and 904 in FIG. 9 respectively, and operation details of the above actions 1003, 1005 and 1006 may be the same as those of actions 201, 202 and 203 in FIG. 2 respectively, and this will not be further described herein.

Some embodiments of the present invention further encompass a traffic condition prediction method described below. The traffic condition prediction method may be used for a traffic condition prediction system, and the traffic condition prediction system stores a first scene feature of a first traffic scene, a first prediction model for predicting traffic condition of the first traffic scene, at least one actual vehicle trajectory related to the second traffic scene and a surveillance image of the second traffic scene. The traffic condition prediction method comprises the following steps: predicting at least one predicted vehicle trajectory related to the second traffic scene through the first prediction model; determining whether the at least one actual vehicle trajectory is similar to the at least one predicted vehicle trajectory; when determining that the at least one actual vehicle trajectory is similar to the at least one predicted vehicle trajectory, determining a center of circle in the surveillance image; determining a first circle based on the center of circle and a first radius; extracting a plurality of first feature points on the surveillance image along the circumference of the first circle according to a first preset sampling frequency; generating a second scene feature of the second traffic scene at least according to the plurality of first feature points; determining whether the first scene feature is similar to the second scene feature; and when determining that the first scene feature is similar to the second scene feature, predicting the traffic condition of the second traffic scene through the first prediction model. The first scene feature and the second scene feature are generated in a same way. Optionally, the traffic condition prediction method additionally comprises the following steps: determining a second circle based on the center of circle and a second radius; and extracting a plurality of second feature points on the surveillance image along the circumference of the second circle according to a second preset sampling frequency; wherein the traffic condition prediction system generates the second scene feature according to the plurality of first feature points and the plurality of second feature points. Optionally, each of the first scene feature and the second scene feature is a numerical sequence, and the traffic condition prediction method additionally comprises: comparing the two numerical sequences based on a rotation invariance to determine whether the first scene feature and the second scene feature are similar. Optionally, the surveillance image of the second traffic scene is taken by a camera. Optionally, each of the at least one actual vehicle trajectory is represented by a binary code sequence, and each of the at least one predicted vehicle trajectory is also represented by a binary code sequence. Optionally, each of all the binary code sequences representing the at least one actual vehicle trajectory and the at least one predicted vehicle trajectory is defined by a first symbol and a second symbol, the first symbol represents the presence of lane switch, and the second symbol represents the absence of lane switch.

The above embodiments are only for illustrating the present invention, and are not intended to limit the scope claimed in the present invention. The evaluation result output by the prediction model may be collectively referred to as "traffic condition", which includes but is not limited to: the predicted moving direction, or even the appearance, of a target traffic object in the second traffic scene according to the trajectory observation of the target traffic object in a first traffic scene, and which reflects the current traffic condition. The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A traffic condition prediction system, comprising:
a storage, being configured to store a first scene feature of a first traffic scene, a first prediction model for predicting traffic condition of the first traffic scene, and a surveillance image of a second traffic scene; and
a processor electrically connected to the storage, being configured to:
determine a center of circle in the surveillance image;
determine a first circle based on the center of circle and a first radius;
extract a plurality of first feature points on the surveillance image along the circumference of the first circle according to a first preset sampling frequency;
generate a second scene feature of the second traffic scene at least according to the plurality of first feature points;
determine whether the first scene feature is similar to the second scene feature; and
when determining that the first scene feature is similar to the second scene feature, predict traffic condition of the second traffic scene through the first prediction model;
wherein the first scene feature and the second scene feature are generated in a same way.

2. The traffic condition prediction system of claim 1, wherein:
the processor is further configured to:
determine a second circle based on the center of circle and a second radius; and
extract a plurality of second feature points on the surveillance image along the circumference of the second circle according to a second preset sampling frequency; and
the processor generates the second scene feature according to the plurality of first feature points and the plurality of second feature points.

3. The traffic condition prediction system of claim 1, wherein each of the first scene feature and the second scene feature is a numerical sequence, and the processor compares the two numerical sequences based on a rotation invariance to determine whether the first scene feature and the second scene feature are similar.

4. The traffic condition prediction system of claim 1, wherein the surveillance image of the second traffic scene is taken by a camera.

5. A traffic condition prediction system, comprising:
a storage, being configured to store a first scene feature of a first traffic scene, a first prediction model for predicting traffic condition of the first traffic scene, at least one actual vehicle trajectory related to a second traffic scene, and a surveillance image of the second traffic scene; and
a processor electrically connected to the storage, being configured to:
determine a center of circle in the surveillance image;
determine a first circle based on the center of circle and a first radius;
extract a plurality of first feature points on the surveillance image along the circumference of the first circle according to a first preset sampling frequency;
generate a second scene feature of the second traffic scene at least according to the plurality of first feature points;
determine whether the first scene feature is similar to the second scene feature;
when determining that the first scene feature is similar to the second scene feature, predict at least one vehicle trajectory related to the second traffic scene through the first prediction model, and determine whether the at least one actual vehicle trajectory is similar to the at least one predicted vehicle trajectory; and
when determining that the at least one actual vehicle trajectory is similar to the at least one predicted vehicle trajectory, predict the traffic condition of the second traffic scene through the first prediction model;
wherein the first scene feature and the second scene feature are generated in a same way.

6. The traffic condition prediction system of claim 5, wherein:
the processor is further configured to:
determine a second circle based on the center of circle and a second radius; and
extract a plurality of second feature points on the surveillance image along the circumference of the second circle according to a second preset sampling frequency; and
the processor generates the second scene feature according to the plurality of first feature points and the plurality of second feature points.

7. The traffic condition prediction system of claim 5, wherein each of the first scene feature and the second scene feature is a numerical sequence, and the processor compares the two numerical sequences based on a rotation invariance to determine whether the first scene feature and the second scene feature are similar.

8. The traffic condition prediction system of claim 5, wherein the surveillance image of the second traffic scene is taken by a camera.

9. The traffic condition prediction system of claim 5, wherein each of the at least one actual vehicle trajectory is represented by a binary code sequence, and each of the at least one predicted vehicle trajectory is also represented by a binary code sequence.

10. The traffic condition prediction system of claim 9, wherein each of all the binary code sequences representing the at least one actual vehicle trajectory and the at least one predicted vehicle trajectory is defined by a first symbol and a second symbol, the first symbol represents a presence of lane switch, and the second symbol represents an absence of lane switch.

11. A traffic condition prediction method for a traffic condition prediction system, the traffic condition prediction system storing a first scene feature of a first traffic scene, a first prediction model for predicting traffic condition of the first traffic scene, and a surveillance image of a second traffic scene, the traffic condition prediction method comprising:
- determining a center of circle in the surveillance image;
- determining a first circle based on the center of circle and a first radius;
- extracting a plurality of first feature points on the surveillance image along the circumference of the first circle according to a first preset sampling frequency;
- generating a second scene feature of the second traffic scene at least according to the plurality of first feature points;
- determining whether the first scene feature is similar to the second scene feature; and
- when determining that the first scene feature is similar to the second scene feature, predicting traffic condition of the second traffic scene through the first prediction model;
- wherein the first scene feature and the second scene feature are generated in a same way.

12. The traffic condition prediction method of claim 11, further comprising:
- determining a second circle based on the center of circle and a second radius; and
- extracting a plurality of second feature points on the surveillance image along the circumference of the second circle according to a second preset sampling frequency;
- wherein the traffic condition prediction system generates the second scene feature according to the plurality of first feature points and the plurality of second feature points.

13. The traffic condition prediction method of claim 11, wherein each of the first scene feature and the second scene feature is a numerical sequence, and the traffic condition prediction method further comprises:
- comparing the two numerical sequences based on a rotation invariance to determine whether the first scene feature and the second scene feature are similar.

14. The traffic condition prediction method of claim 11, wherein the surveillance image of the second traffic scene is taken by a camera.

* * * * *